(12) United States Patent
D'Aluisio

(10) Patent No.: US 8,678,339 B2
(45) Date of Patent: Mar. 25, 2014

(54) BICYCLE SEAT WITH RESILIENT SUPPORT

(75) Inventor: Christopher P. D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/410,777

(22) Filed: Mar. 2, 2012

(65) Prior Publication Data

US 2013/0228668 A1 Sep. 5, 2013

Related U.S. Application Data

(63) Continuation-in-part of application No. 12/713,732, filed on Feb. 26, 2010, now abandoned.

(51) Int. Cl.
*B62J 1/02* (2006.01)
*B62J 1/00* (2006.01)
*F16M 13/00* (2006.01)

(52) U.S. Cl.
USPC ........... 248/629; 248/621; 248/611; 248/613; 248/604; 297/196; 297/195.1; 297/215; 297/198; 267/133; 267/160; 267/164

(58) Field of Classification Search
USPC .......... 248/629, 621, 611, 613, 604; 297/196, 297/195.1, 215, 198, 204, 283, 199; 280/287, 132; 267/133, 160, 164
See application file for complete search history.

(56) References Cited

U.S. PATENT DOCUMENTS

| 275,910 | A | * | 4/1883 | Hill | 267/132 |
|---|---|---|---|---|---|
| 477,123 | A | * | 6/1892 | Johnson | 297/199 |
| 666,061 | A | * | 1/1901 | Naber | 267/132 |
| 2,587,121 | A | * | 2/1952 | Deardorff et al. | 267/117 |
| 2,828,801 | A | * | 4/1958 | Papst | 248/629 |
| 4,568,121 | A | * | 2/1986 | Kashima | 297/215.15 |
| 4,934,724 | A | * | 6/1990 | Allsop et al. | 280/281.1 |
| 5,020,851 | A | * | 6/1991 | Chen | 297/195.1 |
| 5,029,888 | A | * | 7/1991 | Allsop et al. | 280/281.1 |
| 5,368,358 | A | * | 11/1994 | Christensen | 297/215 |
| 5,573,304 | A | * | 11/1996 | Glockl | 297/314 |
| 5,702,093 | A | * | 12/1997 | Liao | 267/132 |
| 7,513,568 | B2 | * | 4/2009 | Hung | 297/195.1 |
| 7,549,698 | B2 | * | 6/2009 | Segato | 297/196 |
| 7,562,933 | B1 | * | 7/2009 | Chao et al. | 297/215.13 |
| 7,997,645 | B2 | * | 8/2011 | Tseng | 297/215.15 |
| 8,197,002 | B2 | * | 6/2012 | Hsu | 297/215.15 |
| 2005/0029842 | A1 | * | 2/2005 | Martin et al. | 297/199 |
| 2006/0066074 | A1 | * | 3/2006 | Turner | 280/287 |
| 2006/0290096 | A1 | * | 12/2006 | Beaulieu | 280/287 |
| 2008/0246314 | A1 | * | 10/2008 | Hung | 297/195.1 |
| 2009/0306792 | A1 | * | 12/2009 | Lecomte et al. | 623/55 |
| 2010/0237668 | A1 | * | 9/2010 | Tseng | 297/195.1 |

* cited by examiner

*Primary Examiner* — Terrell McKinnon
*Assistant Examiner* — Christopher Garft
(74) *Attorney, Agent, or Firm* — Michael Best & Friedrich LLP

(57) ABSTRACT

A bicycle seat support that resiliently supports a bicycle seat and comprises an upper engagement member adapted to support a bicycle seat, a lower engagement member adapted to engage a bicycle frame, and a compliant support assembly coupling the upper engagement member to the lower engagement member. The compliant support assembly includes a first cantilevered beam cantilevered to the lower engagement member, and a second cantilevered beam cantilevered to the first cantilevered beam. The first and second cantilevered beams define a gap, and a resilient member is positioned in the gap. Preferably, the cantilevered beams include convex surfaces, and the resilient member includes concave surfaces shaped to receive the convex surfaces. The resilient member can include a body portion and a strut (e.g., two struts). The resilient member can also include a side surface and a recess in the side surface (e.g., extending all the way through the resilient member).

20 Claims, 6 Drawing Sheets

BICYCLE SEAT WITH RESILIENT SUPPORT

PRIORITY CLAIM

This is a continuation-in-part of U.S. application Ser. No. 12/713,732, filed Feb. 26, 2010, the entire contents of which is hereby incorporated by reference.

BACKGROUND

The present invention relates to bicycle seats, and particularly to resilient seat supports.

Bicycles commonly have resilient seat supports that cushion the rider from vibrations and bumps while riding. Resilient seat supports commonly include coil springs or resilient pads positioned between a seat and a seat post.

SUMMARY

The present invention relates to an improved bicycle seat support that resiliently supports a bicycle seat. The seat support comprises an upper engagement member adapted to support a bicycle seat, a lower engagement member adapted to engage a bicycle frame, and a compliant support assembly coupling the upper engagement member to the lower engagement member. The compliant support assembly includes a first cantilevered beam cantilevered to the lower engagement member, and a second cantilevered beam cantilevered to the first cantilevered beam (e.g., at an elbow). The first and second cantilevered beams define a gap, and a resilient member is positioned in the gap (e.g., contacting the first and second cantilevered beams and the elbow).

In one embodiment, the first cantilevered beam is positioned at an angle of between 60 degrees and 90 degrees (preferably 70 to 80 degrees, and most preferably about 75 degrees) from the lower engagement member. The second cantilevered beam can be positioned at an angle of between 20 degrees and 50 degrees (preferably 25 to 40 degrees, and most preferably 32 degrees) from the first cantilevered beam.

Preferably, the first cantilevered beam includes a convex upper surface, and the resilient member includes a concave lower surface shaped to receive the convex upper surface. Similarly, the second cantilevered beam can include a convex lower surface, and the resilient member can include a concave upper surface shaped to receive the convex lower surface. In one embodiment, the first and second cantilevered beams are coupled at an elbow having a middle convex surface, and the resilient member includes a concave middle surface shaped to receive the convex middle surface.

The resilient member can include a body portion having an upper portion and a lower portion, and a strut (e.g., two struts) connected between the upper portion and the lower portion. The resilient member can also include a side surface and a recess in the side surface (e.g., extending all the way through the resilient member).

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
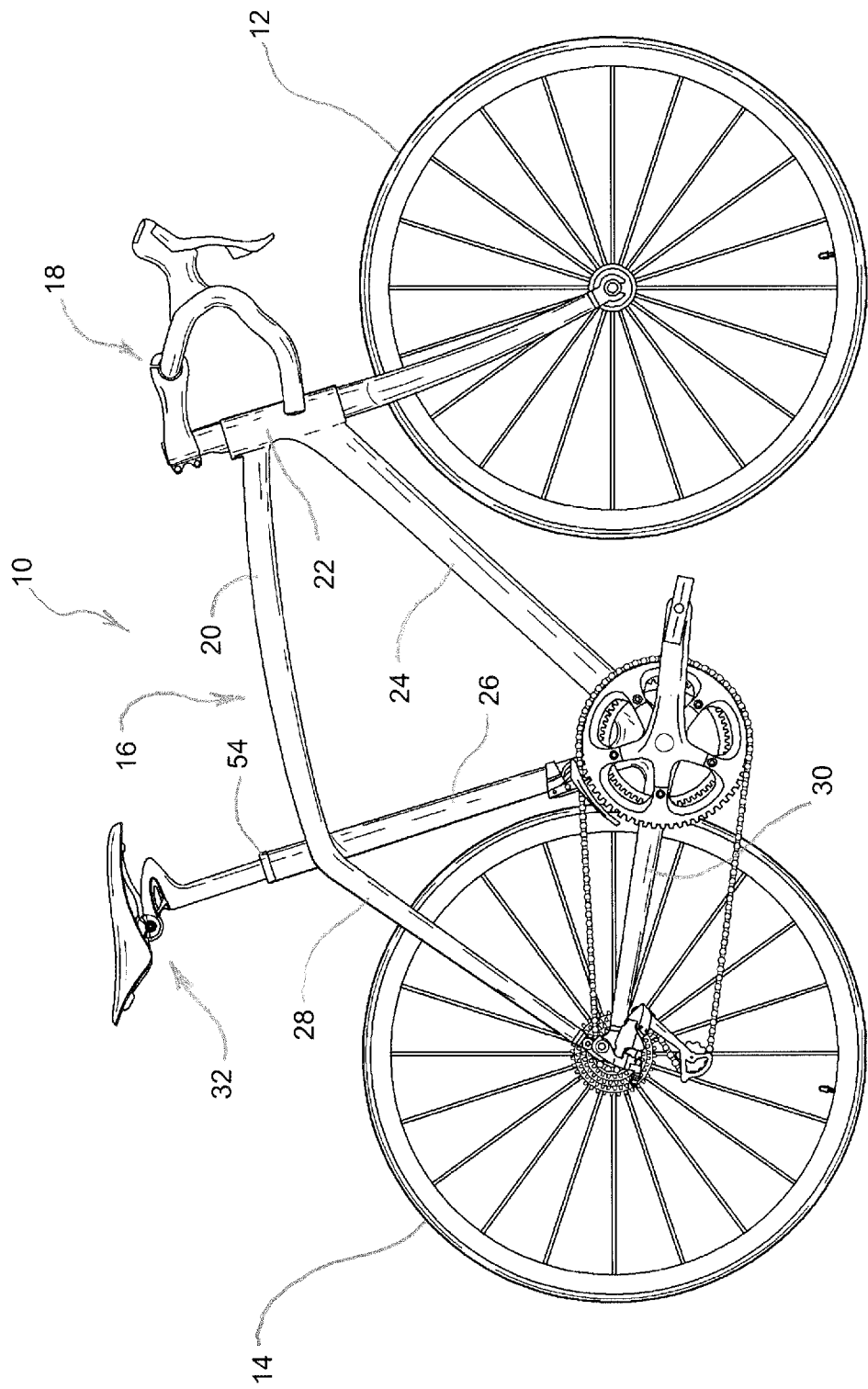
FIG. 1 illustrates a side view of a bicycle having a bicycle seat assembly embodying the present invention.

FIG. 1 illustrates a bicycle 10 that includes a front wheel 12, a rear wheel 14, a frame 16, and a steering assembly 18. The frame 16 includes a top tube 20, a head tube 22, a down tube 24, a seat tube 26, seatstays 28, and chainstays 30. A bicycle seat assembly 32 is supported by the frame 16 and provides a surface upon which a rider sits while riding the bicycle 10.

Figure 2:
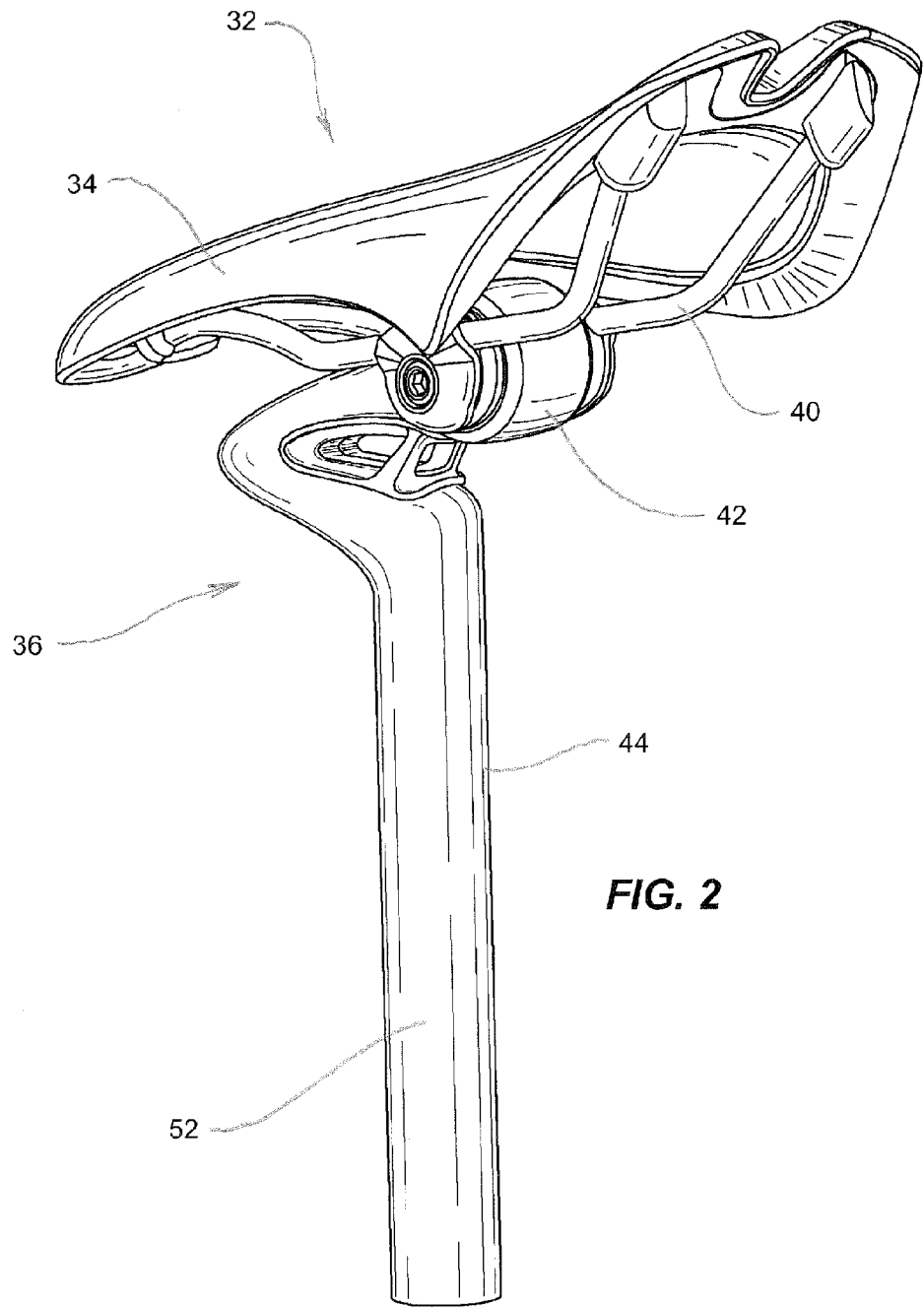
FIG. 2 is a perspective view of the bicycle seat assembly of FIG. 1.
Figure 3:
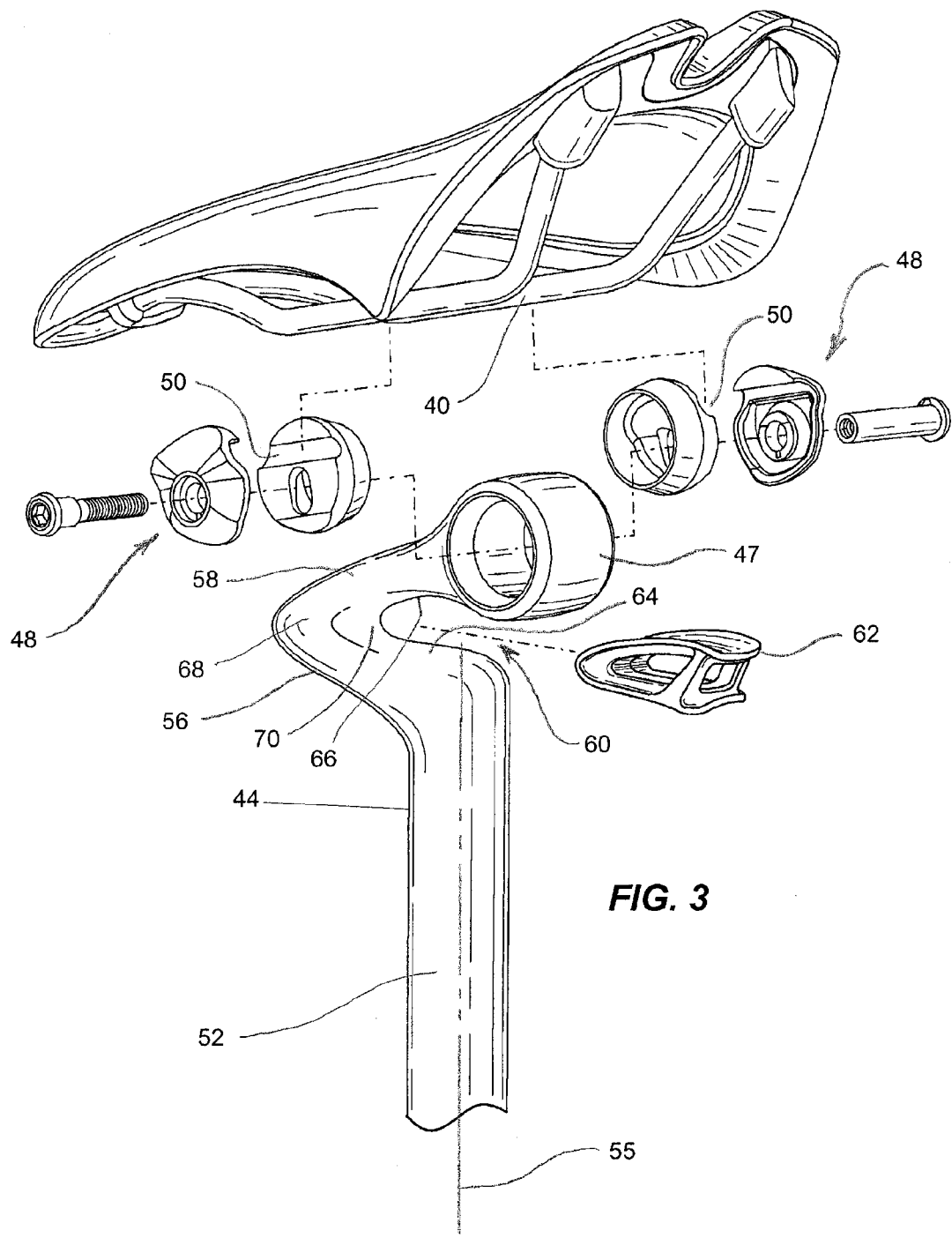
FIG. 3 is an exploded view of the bicycle seat assembly of FIG. 2.

Referring to FIGS. 2-3, the bicycle seat assembly 32 includes a bicycle seat 34 supported by a bicycle seat support 36. The illustrated bicycle seat 34 is a standard seat having a contoured upper surface for supporting the rider, and lower rails 40 adapted to be secured to the bicycle seat support 36.

The bicycle seat support 36 includes an upper engagement member 42 engaged with and supporting the lower rails 40, a lower engagement member 44 secured to and supported by the seat tube 26 of the frame 16, and a compliant support assembly connecting the upper engagement member 42 to the lower engagement member 44. The illustrated upper engagement member 42 includes a cylindrical mount 47 and two pairs of clamp members 48 that each define longitudinal recesses 50 for receiving and clamping the lower rails 40 of the bicycle seat 34. The illustrated lower engagement member 44 comprises a cylindrical seat post 52 secured inside the seat tube 26 of the frame 16 by a clamp 54 (FIG. 1). The seat post 52 defines a lower axis 55.

Figure 4:
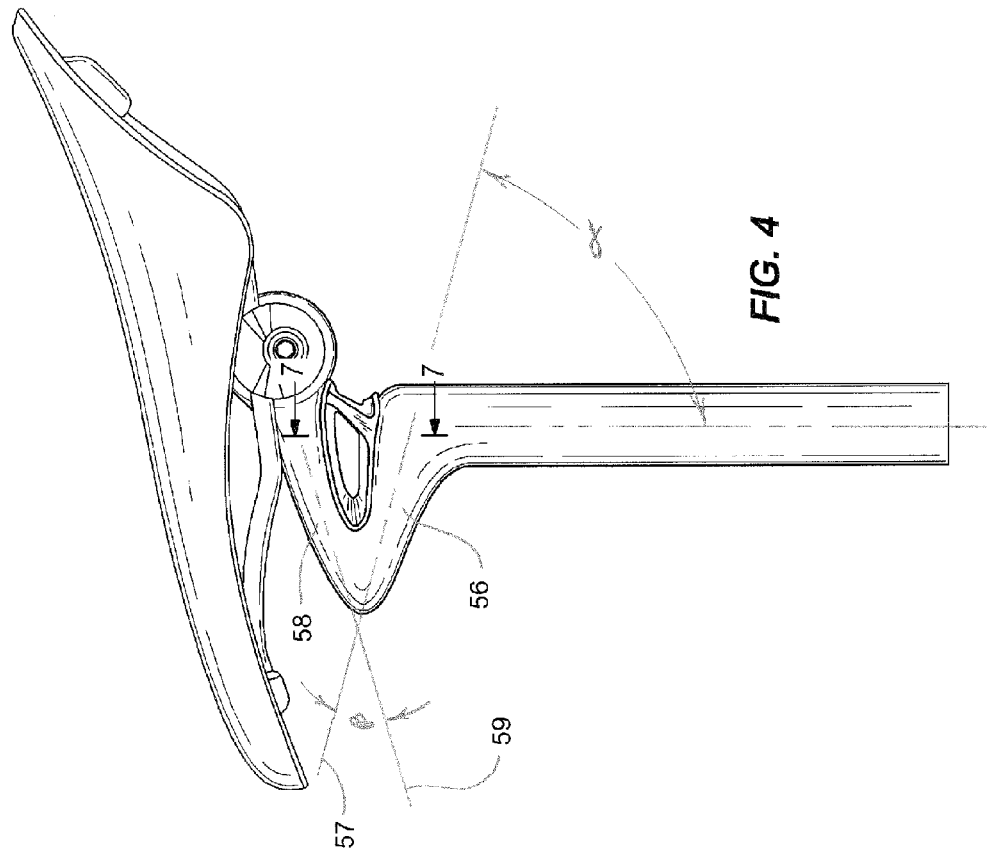
FIG. 4 is a side view of the bicycle seat assembly of FIG. 2.
Figure 5:
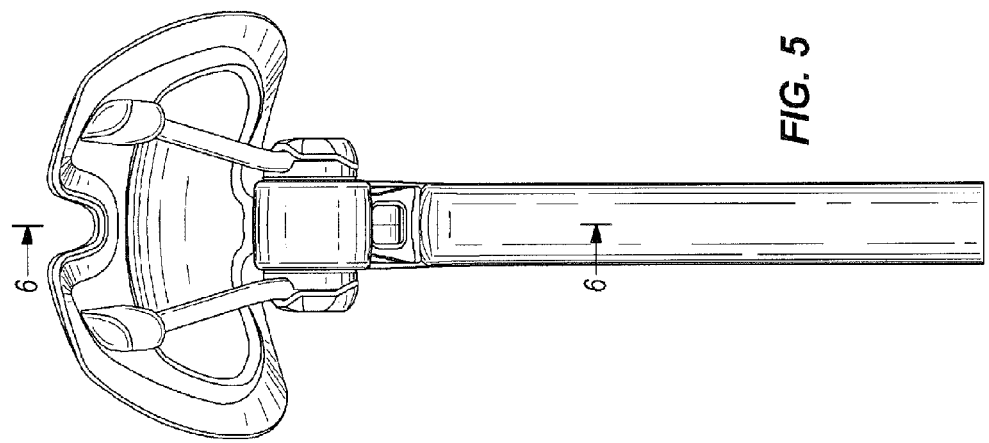
FIG. 5 is a rear view of the bicycle seat assembly of FIG. 2.
Figure 6:
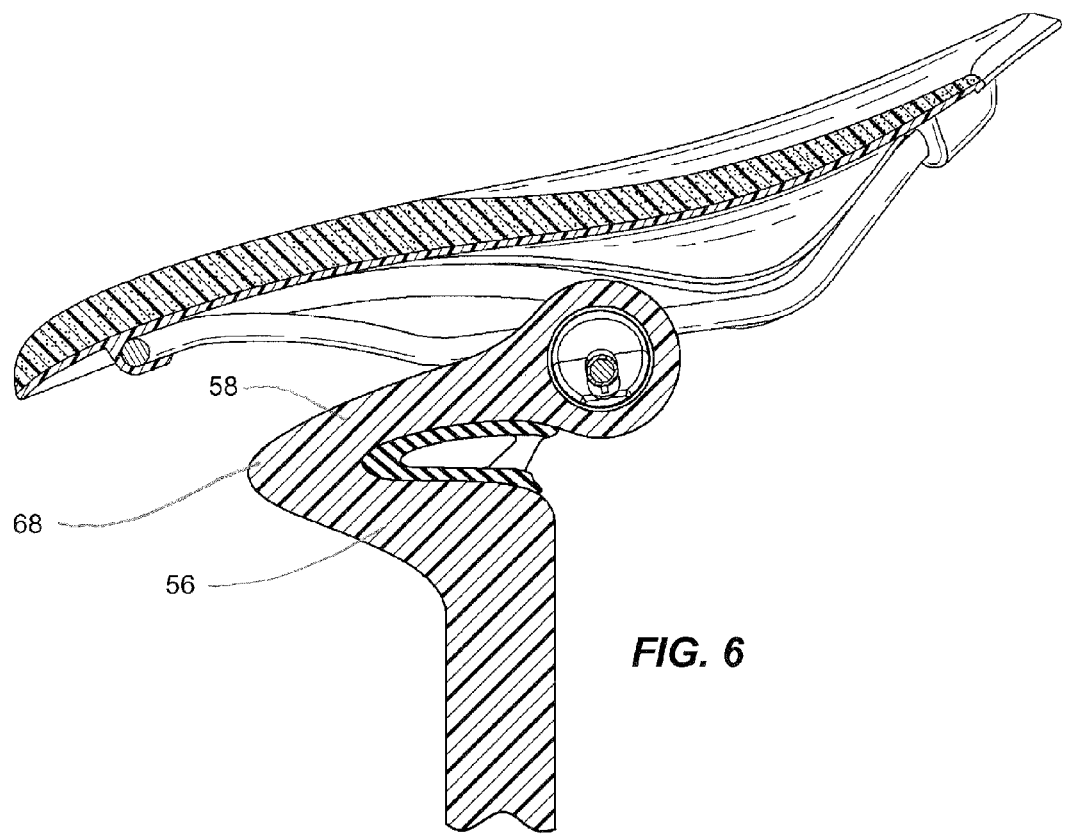
FIG. 6 is a side section view taken along line 6-6 in FIG. 5.
Figure 7:
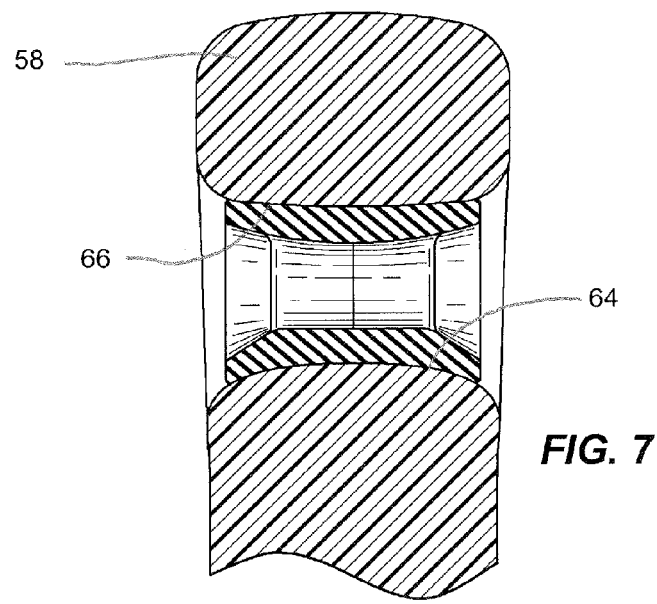
FIG. 7 is a section view taken along line 7-7 of FIG. 4.

Referring to FIGS. 3 and 4, the illustrated compliant support assembly includes a first cantilevered beam 56 defining a first axis 57, a second cantilevered beam 58 defining a second axis 59 and spaced from the first cantilevered beam 56 to define a gap 60 (FIG. 3), and a resilient member 62 positioned in the gap 60. The first cantilevered beam 56 includes a proximal portion cantilevered to the lower engagement member 44, and the second cantilevered beam 58 includes a proximal portion cantilevered to a distal portion of the first cantilevered beam 56. A distal portion of the second cantilevered beam is secured to the upper engagement member 42.

The first axis 57 is positioned at an angle a of about seventy-five degrees relative to a lower axis 55 of the seat post 52, and the second axis 59 is positioned at an angle β of about thirty-two degrees relative to the first axis 57. Each of the first and second cantilevered beams 56, 58 comprises a composite material (e.g., carbon fibers in an epoxy matrix) that is sufficiently flexible to resiliently support a rider positioned on the bicycle seat 34. In the illustrated embodiment, the first and second cantilevered beams 56,58 are formed integrally with the lower engagement member 44 and cylindrical mount 47 as a one-piece molded composite member. Flexing of the cantilevered springs 56,58 results in primarily vertical movement of the seat 34, and very little horizontal movement of the seat 34.

The first cantilevered beam 56 includes an upper surface 64 that is convex, and the second cantilevered beam 58 includes a lower surface 66 that is convex. The first and second cantilevered beams 56,58 meet at an elbow 68 that has a middle surface 70 that is convex and between the upper surface 64 and the lower surface 66.

Figure 8:
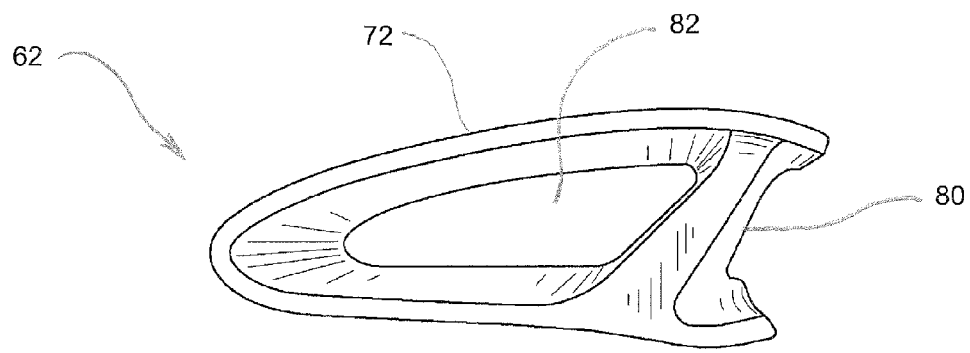
FIG. 8 is side view of a resilient member used in the bicycle seat assembly of FIGS. 1-7.
Figure 9:
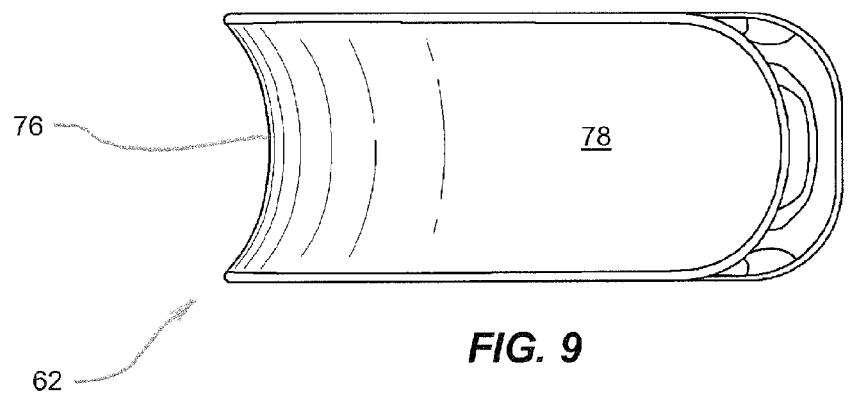
FIG. 9 is a bottom view of the resilient member of FIG. 8.
Figure 10:
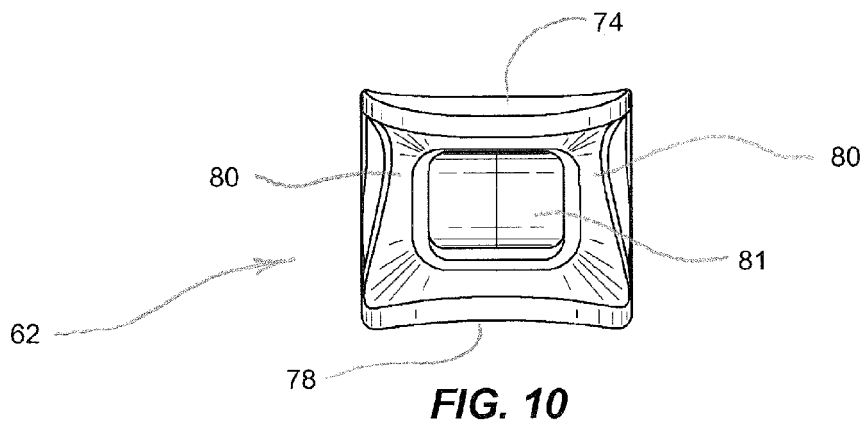
FIG. 10 is a rear view of the resilient member of FIG. 8

The resilient member 62 provides additional resilient support to the bicycle seat 34. Referring to FIGS. 8-10, the resilient member 62 includes a body portion 72 having an upper concave surface 74 shaped to receive the convex lower surface 66, a middle concave surface 76 shaped to receive the convex middle surface 70, and a lower concave surface 78 shaped to receive the convex upper surface 64. The upper, lower, and middle concave surfaces 74,76,78 are contiguous with each other. As a result of the illustrated and described arrangement, the resilient member 62 is shaped to fit completely and securely within the gap 60 without the need for fasteners, adhesive, of other means for securing the resilient member 62 in the gap 60.

The resilient member 62 further includes two transverse struts 80 separated by an opening 81 and that connect an end of the upper part of the body portion 72 with an end of the lower part of the body portion 72. The struts 80 and body portion 72 collectively define a recess 82 extending laterally into the resilient member 62. In the illustrated embodiment, the recess 82 extends all the way through the resilient member 62 to form an opening through the resilient member 62.

The illustrated resilient member 62 comprises a polyurethane elastomer having a hardness less than the hardness of the cantilevered beams 56, 58. In the preferred embodiment, the resilient member 62 is permanently secured in the gap 60, such as by adhesive. Alternatively, the resilient member 62 can be held in place in any other appropriate manner, such as using an interference fit, mechanical engagement, or fasteners.

In an alternative embodiment, the resilient member 62 can be secured in the gap in such a manner that it can removed from the gap 60 by the user so that a different resilient member can be used. For example, if the resilient member 62 becomes damaged or worn, a replacement resilient member can be substituted. Alternatively, if it is desired to achieve a different resiliency, a resilient member having a different stiffness can be used. For example, if it desired to increase the stiffness of the compliant support assembly 46, a resilient member having less resiliency can be substituted into the gap 60. Such a replacement resilient member could use a stiffer material, a thicker body portion, or larger struts, for example. In the illustrated embodiment, the resilient member 62 is held in place by adhesive.

Various features and advantages of the invention are set forth in the following claims.

The invention claimed is:

1. A bicycle seat support comprising:
    an upper engagement member adapted to support a bicycle seat;
    a lower engagement member adapted to engage a bicycle frame; and
    a compliant support assembly coupling the upper engagement member to the lower engagement member, the compliant support assembly including:
        a first cantilevered beam including a convex upper surface and having a first proximal portion cantilevered to the lower engagement member and a first distal portion spaced from the first proximal portion;
        a second cantilevered beam having a second proximal portion cantilevered to the first distal portion and a second distal portion spaced from the second proximal portion, the first and second cantilevered beams defining a gap; and
        a resilient member positioned in the gap, the resilient member having an upper portion defined by an upper, outer concave surface and a lower portion defined by a lower, outer concave surface shaped to receive the convex upper surface of the first cantilevered beam.

2. A bicycle seat support as claimed in claim 1, wherein the lower engagement member defines a lower axis, and wherein the first cantilevered beam defines a first axis at an angle of between 60 degrees and 90 degrees from the lower axis.

3. A bicycle seat support as claimed in claim 2, wherein the second cantilevered beam defines a second axis at an angle of between 20 degrees and 50 degrees from the first axis.

4. A bicycle seat support as claimed in claim 1, wherein the second cantilevered beam includes a convex lower surface, and wherein the upper, outer concave surface is shaped to receive the convex lower surface of the second cantilevered beam.

5. A bicycle seat support as claimed in claim 1, wherein the first and second cantilevered beams are coupled at an elbow, and wherein the resilient member contacts the elbow.

6. A bicycle seat support as claimed in claim 1, wherein the resilient member includes a recess extending laterally into the resilient member.

7. A bicycle seat support as claimed in claim 6, wherein the recess extends all the way through the resilient member.

8. A bicycle seat support as claimed in claim 1, wherein the resilient member includes a strut connected between the upper portion and the lower portion.

9. A bicycle seat support as claimed in claim 8, wherein the strut includes two struts between the upper portion and the lower portion.

10. A bicycle seat support comprising:
    an upper engagement member adapted to support a bicycle seat;
    a lower engagement member adapted to engage a bicycle frame; and
    a compliant support assembly coupling the upper engagement member to the lower engagement member, the compliant support assembly including:
        a first cantilevered beam having a first proximal portion cantilevered to the lower engagement member and a first distal portion spaced from the first proximal portion;
        a second cantilevered beam including a convex lower surface and having a second proximal portion cantilevered to the first distal portion and a second distal portion spaced from the second proximal portion, the first and second cantilevered beams defining a gap; and
        a resilient member positioned in the gap, the resilient member having an upper portion defined by an upper, outer concave surface shaped to receive the convex lower surface of the second cantilevered beam, and a lower portion defined by a lower, outer concave surface.

11. A bicycle seat support as claimed in claim 10, wherein the resilient member includes laterally-oriented side surfaces, and a recess extending completely through the body portion between the side surfaces.

12. A bicycle seat support as claimed in claim 11, further comprising a strut connected between the upper portion and the lower portion.

13. A bicycle seat support as claimed in claim 12, wherein the strut includes two struts extending between the upper portion and the lower portion.

14. A bicycle seat support as claimed in claim 10, wherein the first and second cantilevered beams are coupled at an elbow, and wherein the resilient member contacts the elbow.

15. A bicycle seat support as claimed in claim 10, wherein the resilient member includes a recess extending laterally into the resilient member.

16. A bicycle seat support as claimed in claim 15, wherein the recess extends all the way through the resilient member.

17. A bicycle seat support comprising:
- an upper engagement member adapted to support a bicycle seat;
- a lower engagement member adapted to engage a bicycle frame; and
- a compliant support assembly coupling the upper engagement member to the lower engagement member, the compliant support assembly including:
  - a first cantilevered beam having a first proximal portion cantilevered to the lower engagement member and a first distal portion spaced from the first proximal portion;
  - a second cantilevered beam having a second proximal portion cantilevered to the first distal portion and a second distal portion spaced from the second proximal portion, the first and second cantilevered beams coupled to each other at an elbow and defining a gap; and
  - a resilient member positioned in the gap and contacting the elbow, the resilient member having an upper portion defined by an upper, outer concave surface and a lower portion defined by a lower, outer concave surface.

18. A bicycle seat support as claimed in claim 17, wherein the first cantilevered beam includes a convex upper surface, and wherein the lower, outer concave surface is shaped to receive the convex upper surface of the first cantilevered beam.

19. A bicycle seat support as claimed in claim 18, wherein the second cantilevered beam includes a convex lower surface, and wherein the upper, outer concave surface is shaped to receive the convex lower surface of the second cantilevered beam.

20. A bicycle seat support as claimed in claim 17, wherein the resilient member includes a strut connected between the upper portion and the lower portion.

* * * * *